INVENTORS.
PAUL E. YOUNG
LYMAN J. GUNYOU
BY
ATTORNEYS.

United States Patent Office 3,450,138
Patented June 17, 1969

3,450,138
MATERIAL-SEPARATING MECHANISM FOR A HUSKING UNIT
Paul E. Young, Coldwater, and Lyman J. Gunyou, Celina, Ohio, assignors to Avco Corporation, Coldwater, Ohio, a corporation of Delaware
Filed Aug. 22, 1966, Ser. No. 573,982
Int. Cl. A01f 11/06
U.S. Cl. 130—5                                                    6 Claims

ABSTRACT OF THE DISCLOSURE

The invention is a material delivery and separating system for use with corn processing machinery of the type which includes a husking bed having material advancing means disposed within a husking region, and with a conveyor having a delivery mouth arranged to deliver an aggregate of ears and trash material. A trash disposal container has a bottom wall so formed that the container and the mouth and the husking bed define passages to the husking bed and the container. Two blowers are disposed proximate the remote end of the husking region. The first blower forces air down the path between the material advancing means and the bed so that air circulating therein urges material into contact with the bed. The second blower forces air down the other path between the material-advancing means and the bottom of the container. The paths converge at the mouth so that the airborne trash is removed from the husking region, partially deflected by material in the conveyor and carried into the container.

---

This invention relates to a material separating mechanism for a husking unit of a type useful for husking ears of corn snapped from standing stalks by a field-going corn harvesting mechanism.

The mechanism herein disclosed facilitates removal of the lighter, leafy trash from the material reaching the husking rolls of a corn husking unit. The removal results in a more efficient husking by the machine and a decreased load on the cleaning mechanism.

An important feature of the improved mechanism includes means to provide a distributed air flow of the type which might be furnished from two fans. The air from one fan, or one branch of the divided flow from a single fan, is directed down at an inclination relative to the counter-rotating husking rolls comprising the so-called husking bed, pressing the ears and material more positively onto the husking rolls. This portion of the air flow then moves up along the husking rolls loosening the husks from the ears for more efficient husking. The air from the second fan, or the other branch of the divided air flow, is directed along higher region above the husking bed to an area at the entering end of the husking bed (i.e., the area receiving falling material from a conveyor connected to the harvesting mechanism). The combined air flow resulting from the converging of the distributed air flows then moves up through the material being delivered to the husking bed from the conveyor. The conveyor constitutes the output of that portion of the corn harvester in which ears are snapped from the stalks. The air flow paths having been thus distributed in a manner assuring full coverage of the region on and above the husking bed, converge so that the convereged stream removes the light trash and leafy material to a trash-containing chamber. This trash container is provided with a trash-ejecting auger which moves the stalk and trash material collected through the so-called clearing trash rolls 9, as well as from the aforesaid distributed air circulation, out from the trash-containing chamber onto the ground.

It is therefore a primary object of this invention to provide mechanism accomplishing an improved air circulation and air distribution for removing light trash and leafy material by means of directed air flow, either by distributing a flow from a single air circulating means or by means of at least two fans directing air flow over substantially the entire region above the husking bed and particularly adjacent the entering end of such bed. Such region is in the illustrative disclosure defined in part by a wall above the husking bed which also is the bottom wall of a trash container. The converged air flows are directed into such container to carry the trash and leafy material into the container, with means in the container such as an auger conveyor for ejecting such material collected in the container by the air circulation.

The above and other objects of the invention will appear more fully from the following more detailed description and by reference to the accompanying drawings forming a part hereof and wherein:

FIGURE 1 is a side view, partially diagrammatic, showing an arrangement of a husking bed with a trash container so formed and mounted thereabove as to provide a space between the bottom wall of the container and the husking bed, further showing separate means to direct air flow for carrying away light trash and leafy material from the region above the bed into the trash material container, also showing means for ejecting material from said trash container.

Figure 1:
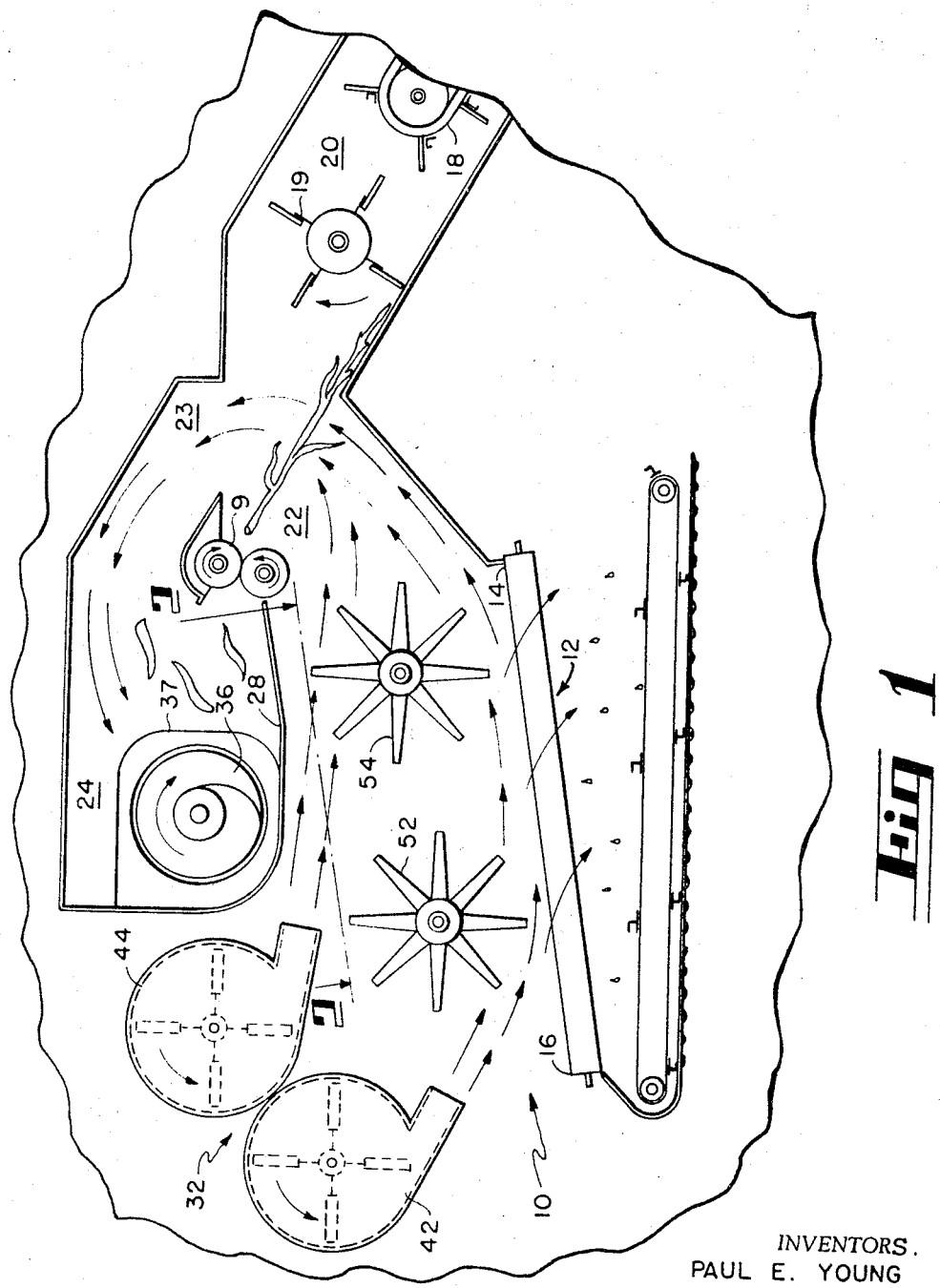

Referring to the drawings and particularly to FIGURE 1, reference numeral 10 designates a material separating mechanism for operation with a husking bed 12 having an entering or upper end 14 and an outlet end 16. A conveyor 18 terminating in a beater 19 adjacent the entering end of the husking bed is provided for carrying ears to be husked and trash material from another part of the harvesting mechanism where such ears have been snapped from standing corn stalks in the field-going harvesting unit of which the mechanism here disclosed is a part. The conveyor is carried in a conveyor channel 20 and this conveyor channel is formed with a delivery mouth in communication with an ear delivery passage 22 in the bottom portion of the channel. A trash material container 24 is positioned above the husking bed 12 and is provided with a trash material conveyor auger ejecting means 36. The bottom wall 28 of the trash material container is positioned a distance above the husking bed 12 and this wall and the husking bed define an air channel above the husking bed. Above the outlet end of the husking bed an air circulating means 32 is provided, here shown as made up of two blowers, a blower 42 and a blower 44. These separate blowers provide for divided air circulation. The lower blower 42 provides for an air circulation directed downward toward and along the husking bed so that the air so directed tends to hold the ears which may be carried on the husking bed downward to make more positive contact with the counter-rotating rolls thereby enabling the rolls to grasp more positively the husks which are separated from the ears by such action. This air directed from the blower 42 also carries along the surface of the husking bed and tends to cause husks to be partially lifted from the ears, in some cases, thereby making it possible for the husks to be directed to the space between the rolls and assisting in removal of the husks from the ears. The other blower 44 is shown positioned above the blower 42 and directs its air flow circulation in the region higher above the husking bed to thereby provide a positive circulation of air in the space between the rolls and the bottom wall of the trash material container 24. As indicated by the arrows in FIG. 1, the air flow in this path is form blower 44, then over the presser wheels 52 and 54. This operation of air flow by the use of two blowers as here described, or as is contemplated in certain conditions by a divided flow of air from one larger blower, will assure that there is positive circulation of air both along the husking bed, as well as in the higher region above the husking bed thereby carrying material with the combined air circulation in a direction from left to right as shown in the drawing, FIGURE 1, toward and through the ear delivery opening 22. By reference to FIGURE 1 it is shown that this air flow will continue through the inlet passage 23 of the container, in the direction shown by the arrows to the interior of the trash material container 24. The beater 19 and the unhusked ears and material coming up the conveyor 20 tend to block the conveyor channel 20 from the passage of air and causes the air circulation to be deflected into the container 24 carrying with it the material which is picked up by the air circulation above and adjacent to the husking bed. This material, together with material which is normally picked up by the trash rolls 9, is forced into the container 24.

The auger conveyor 36 is positioned crosswise of the container 24. There is an opening 37 in the side of the container 24 which surrounds the outlet end of the auger conveyor 36 and this opening 37 serves both as an outlet for both the trash ejected by the auger conveyor as well as the air circulation which has come into the container 24 carrying with it the trash material. Therefore, the result of the air circulation above described is to assure that material in and around and above the husking bed will be carried by this positive air flow into the container through the passage 22 and caused to be ejected therefrom by the auger conveyor as above described.

Figure 2:
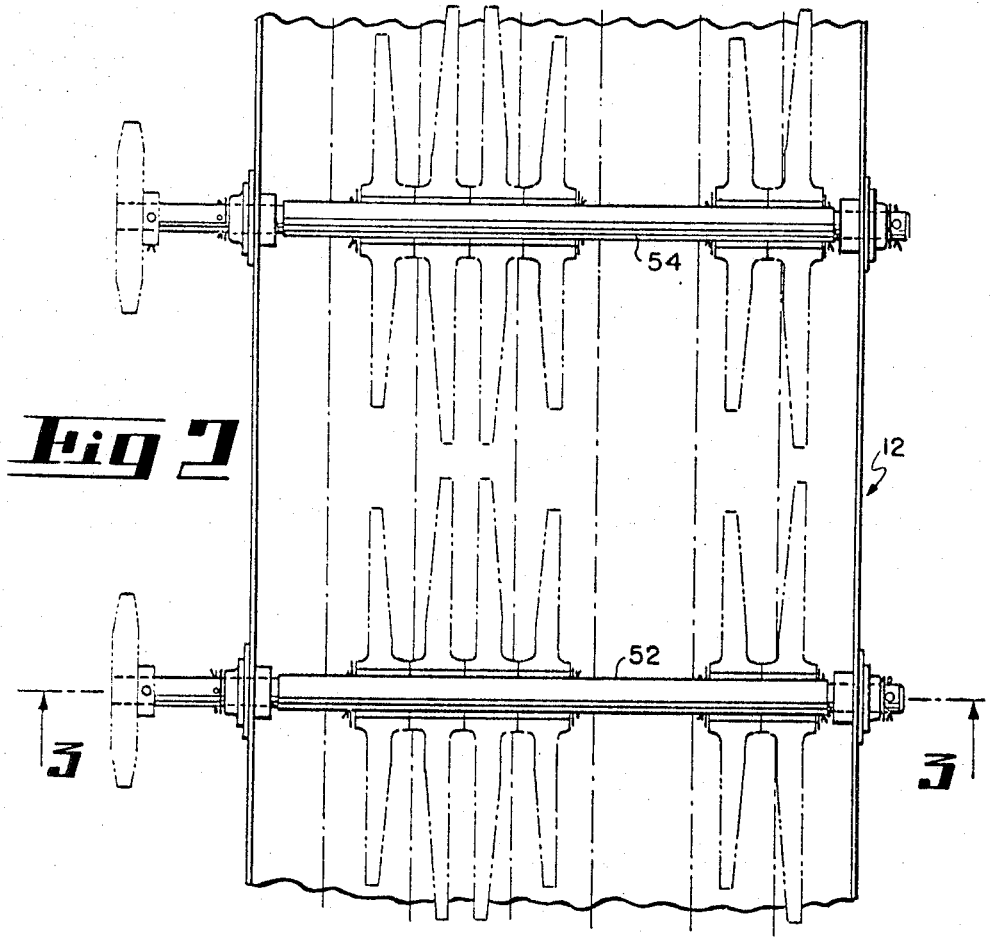
FIGURE 2 is a top view, partly diagrammatic of the husking bed and ear forwarder assemblies, as taken in section substantially on line 2—2 of FIGURE 1.
Figure 3:
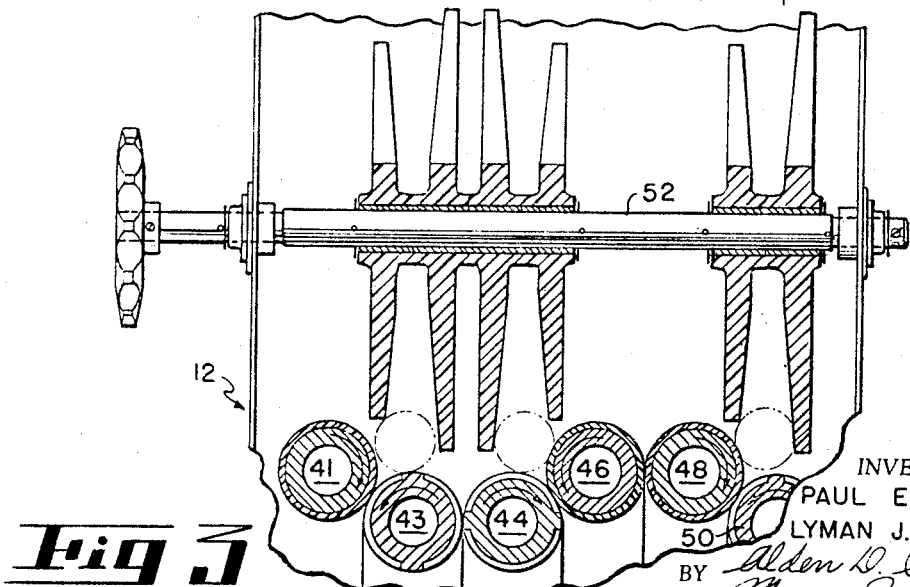
FIGURE 3 is a section taken along the vertical plane including line 3—3 of FIGURE 2 showing the relationship of the ear forwarder and counter-rotating husking rolls making up the husking bed.

Referring to the drawings, FIGURES 2 and 3, the husking bed 12 is made up of a plurality of counter-rotating rolls 40, 41, 43, 46, 48, 50 and so arranged that when ears to be husked are carried on said rolls extending portions of husks on said ears are drawn between the closely adjacent counter-rotating surfaces and the husks thereby removed. The primary purpose of the FIGURES 2 and 3 herein is to show the general arrangement of a husking bed and these figures also include a showing of ear forwarding assemblies or presser wheels 52, 54 comprisng flexible fingers of the type shown in co-pending application S.N. 441,681, filed Mar. 22, 1965, entitled "Flexible Presser Wheel Assemblies for Corn Huskers," now U.S. Patent 3,366,120, issued January 30, 1968, and assigned to the same assignee as the present application and invention. These structures are here shown to indicate one type of husking bed and ear forwardng arrangement which may be used with the invention herein disclosed. The presser wheels 52 and 54 constitute material advancing means.

In operation, snapped ears with husks thereon together with other material come up the conveyor channel 20. The ears being heavier, drop through the ear delivery passage 22 onto the entering end 14 of the husking bed 12. The ears, partially because of the inclination of the husking bed 12 and the rotation of the husking rolls 40, et seq., are carried down the inclined bed 12. During such movement the husks are removed from the ears. By the time the ears reach the outlet end 16 of the husking bed the husks should be removed therefrom. During the husking process there is a certain amount of trash material, such as leaves, husks and lightweight pieces of stalks, which is not removed by the clearing rolls and therefore must be removed either by the husking rolls or by other means. It is this trash material which the structure of the invention herein disclosed is designated to remove. For this purpose the air circulating means 32 here disclosed is made up of blower 42 and blower 44. It is noted that the air directed by the blower 42 flows downward toward the husking bed 12 and along the top surface of the bed and is directed toward the ear delivery passage 22. Likewise the blower 44 directs air in the upper portion of the region between the bed 12 and the lower wall of the trash material container 24 and this air also moves toward the ear outlet opening 22. The region 23 continues into the trash material container 24 and both air flows converge in passage 22 flowing through region 23 and into the trash material container 24. This air circulation thereby causes trash material in the region between the husking bed and the lower wall 28 of the container to be carried into the container, where it is ejected by the auger conveyor 36 through the opening 37 in the side wall of the container 24. It is noted that the opening 37 in the side wall of the container also serves as an air outlet to complete the air circulation into the container and out the side opening 37.

Although the invention has been described by reference to a specific structure found satisfactory in actual operation, it is intended that variations may be made within the scope of the following claims.

We claim:

1. In a trash material separating mechanism for use with a corn harvester having a husking bed and a conveyor channel therefor with an ear delivery opening therein primarily for feeding unhusked ears therethrough onto said husking bed, the combination of:
   a trash material container positioned above said husking bed and having a bottom wall above said bed;
   said bottom wall and said bed defining an air-circulation region,
   material advancing means separating said region into two paths which converge at said delivery opening,
   air directing means having two outlets positioned to direct air flow in the direction opposite to the normal direction of material advance to afford a positive trash material carrying air circulation along both paths through said ear delivery opening and into said trash material container.

2. A trash material separating mechanism as in claim 1 in which:
   the air directing means includes at least two fans, one positioned to direct air flow primarily through the upper path in the region between said material advancing means and said wall of said container and the other fan positioned to direct air flow primarily onto and along the surface of said bed with air flows from both fans converging and flowing through said ear delivery opening into said trash material container.

3. A trash material separating mechanism as in claim 2 in which:
   ejecting means is provided for ejecting collected trash material from said container.

4. A trash material separating mechanism as in claim 3 in which:
   the ejecting means in an auger conveyor positioned crosswise of said container and terminating in an opening in the side of said container.

5. In corn processing machinery of the type which is adapted to be used with a conveyor formed with a delivery mouth and disposed and positioned to deliver an aggregate of ears to be husked and trash material, said machinery further including a husking bed including material-advancing means disposed within a husking region, a materials delivery and separating system comprising in combination:
   a trash disposed container having a bottom wall spaced upwardly from said material advancing means, the container and mouth and husking bed being so formed as to define a passage to the husking bed and a passage to the container, both passages being in communication with said mouth and with each other, and means disposed proximate the end of the husking region remote from said mouth for forcing air under pressure along two paths, one path being between the material advancing means and the bottom of the container.

the other path being between the material advancing means and the bed so that air circulating in the lower path urges material into contact with said bed, said paths converging at said delivery mouth so that trash is removed from the husking region, partially deflected by material in said conveyor, and carried into the container.

6. In corn processing machinery of the type which includes a husking bed including counter-rotating husking rolls and presser wheels spaced from the husking rolls to provide a husking region, a materials delivery and separating system comprising in combination:

a conveyor formed with a delivery mouth and disposed and positioned to carry an aggregate of ears to be husked and trash material, a trash disposel container having a bottom wall spaced upwardly from said presser wheels, the container and mouth and husking bed being so formed as to define a passage to the husking bed and a passage to the container, both passages being in communication with said mouth and with each other, and means disposed proximate the end of the husking region remote from said mouth for forcing air under pressure along two paths, one path being between the rolls and the bottom of the container, the other path being between the rolls and the presser wheels so that air circulating in the lower path urges material into contact with said rolls, said paths converging at said delivery mouth so that trash is removed from the husking region, partially deflected by material in said conveyor, and carried into the container.

References Cited

UNITED STATES PATENTS

| | | | |
|---|---|---|---|
| 2,379,802 | 7/1945 | Hyman | 56—18 |
| 2,492,897 | 12/1949 | Siefken | 130—5 |
| 2,517,401 | 8/1950 | Millard et al. | 56—18 |
| 2,668,543 | 2/1954 | Stoddard | 130—5 |
| 2,822,811 | 2/1958 | Slavens et al. | 130—5 |
| 3,074,412 | 1/1963 | Slavens | 130—5 |
| 3,366,120 | 1/1968 | Gunyou et al. | 56—18 X |

ANTONIO F. GUIDA, *Primary Examiner.*